US011865561B1

(12) United States Patent
Glassell et al.

(10) Patent No.: US 11,865,561 B1
(45) Date of Patent: Jan. 9, 2024

(54) AUTOMATED PAINT SPRAY SYSTEM

(71) Applicant: COLUMBIA INSURANCE COMPANY, Omaha, NE (US)

(72) Inventors: Richard Glassell, Dalton, GA (US); Roman Morris, Dalton, GA (US); Caleb Barton Everett, Dalton, GA (US); Jason Shaw, Dalton, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 0 days.

(21) Appl. No.: 17/399,451

(22) Filed: Aug. 11, 2021

Related U.S. Application Data

(60) Provisional application No. 63/065,145, filed on Aug. 13, 2020.

(51) Int. Cl.

| | |
|---|---|
| ***B05B 13/04*** | (2006.01) |
| ***B05B 1/26*** | (2006.01) |
| ***B05D 1/40*** | (2006.01) |
| ***B05D 1/02*** | (2006.01) |
| ***B05B 15/55*** | (2018.01) |

(52) U.S. Cl.
CPC ............ *B05B 13/0447* (2013.01); *B05B 1/26* (2013.01); *B05B 15/55* (2018.02); *B05D 1/02* (2013.01); *B05D 1/40* (2013.01)

(58) Field of Classification Search
CPC ............ B05B 13/0447; B05B 13/0415; B05B 13/0478
See application file for complete search history.

(56) References Cited

U.S. PATENT DOCUMENTS

| | | | | |
|---|---|---|---|---|
| 8,304,022 B1 * | 11/2012 | Kitchens | C09D 5/021 | 427/262 |
| 2004/0028830 A1 * | 2/2004 | Bauer | B44C 5/043 | 427/325 |
| 2004/0115350 A1 * | 6/2004 | Bolton | B44F 9/02 | 427/407.1 |
| 2015/0110950 A1 * | 4/2015 | Hoppel | B05B 13/041 | 427/8 |

* cited by examiner

*Primary Examiner* — Michael P. Rodriguez
(74) *Attorney, Agent, or Firm* — Laura A. Labeots; Lathrop GPM LLP

(57) ABSTRACT

A spray system and method for selectively applying fluids onto workpieces traveling on a conveyor. A support frame proximate the conveyor supports plural platforms sequentially arranged in the direction of workpiece travel on the conveyor, each platform being above and extending across the conveyor width. Plural carriers are sequentially disposed on each platform across the conveyor width. Each carrier has a nozzle module connected to a source of fluid, a lateral drive enabling bi-directional movement of the carrier across the respective platform and a swing drive for rotating the nozzle module about a swing axis orthogonal to the direction of workpiece travel. A programmable controller coordinates the lateral and rotational orientation of nozzle modules of each carrier and the flow of fluid through the respective nozzle modules to achieve a desired pattern of fluid application onto workpieces traveling on the conveyor.

43 Claims, 6 Drawing Sheets

AUTOMATED PAINT SPRAY SYSTEM

CROSS-REFERENCE TO RELATED APPLICATION

This application claims the benefit of priority to U.S. Provisional Patent Application No. 63/065,145, filed on Aug. 13, 2020, the entirety of which is incorporated herein by reference.

BACKGROUND

Surface coverings, such as for floor coverings, ceilings, furniture, doors, millwork, and the like, may include, but are not limited to, hardwood, engineered hardwood, laminates, composites, and combinations thereof. Solid hardwood flooring consists of planks of solid wood. Engineered hardwood flooring typically includes several wood or plywood layers with a top layer of a thin layer, or lamella, of solid wood. Thus, with solid hardwood or engineered hardwood flooring, each plank has a grain texture that is unique. However, additional processing may be required to meet a desired look and/or finish. Laminate flooring is a multi-layer synthetic flooring product that typically has a top layer with a pre-designed texture, pattern, or textured images printed thereon to resemble real wood. However, pre-designed patterns and textures that are intended to imitate the look of wood texture are usually repeated during the manufacturing process. It is thus possible to visually discern the repeating patterns and to easily recognize the difference between solid hardwood flooring, engineered hardwood flooring, and laminate flooring. In most instances, the look of natural wood is the most desired.

As such, surface coverings may be further processed to provide certain desirable finishes and/or to enhance their visual appeal. One example of additional processing may include adding unique and/or multi-color accents, patterns, and/or textures, to at least a portion of the surface coverings.

Existing technology for this processing includes using traditional robots, similar to those used to finish automobiles or case goods. However, such traditional robots are typically designed to add a single color with precision, and do so at a relatively slow production rate. Furthermore, the existing robot technology lacks modularity, the ability to immediately adapt or change a pattern, design, or color, and the adaptability to be implemented or installed at various positions along an automated manufacturing process line. Moreover, existing technology fails to provide a non-mechanical and organic appearance, which is highly popular. Alternatively, human operators may be employed to perform essentially the same task, with a slightly greater degree of variability in the resulting spray patterns. However, the use of human operators can result in inconsistency in quality and performance. Also, the use of human operators may create a bottleneck due to issues with absent operators or operators not paying close attention to the process, with time. In addition, prolonged exposure to materials, such as paints, inks, and stains used to create the accents could potentially impact the health of the human operators.

Besides employing human operators and traditional robots, an alternative technology for providing desired patterns on workpieces includes digital printing. However, such systems may come with a much higher capital equipment cost, require more physical space, involve clean-room environments, need a higher degree of maintenance, have higher costs for replenishables, like inks, and may not perform adequately on workpieces having heavily distressed or textured surfaces.

Thus, a need exists for an automated system and method for applying unique patterns and colors to surface coverings where the final product appears to be organic and not repetitive, which the present disclosure addresses.

BRIEF SUMMARY

The presently disclosed systems and methods pertain to computer controlled spraying of stain, paint, stain highlights, or other liquids onto planar or substantially planar workpieces as they travel along a conveyor. Multiple spray heads are disposed across the width of the conveyor for applying the liquids onto the workpieces. Each spray head has a spray pressure regulating valve and a spray pattern regulator under control of a programmable controller, thereby enabling control over a range of spray widths, fan patterns, fluid intensities, and colors. Spray heads may be individually controlled to provide different or random spray patterns to achieve, for example, unique distressed looks on workpieces. Beneficially, this customizable patterning may be achieved at fast production speeds, such as greater than about 75 ft/min. Safety is enhanced as human intervention is obviated and efficiency is increased by use of the instant system.

In an aspect, the present disclosure provides a spray system for enabling the selective application of fluids onto workpieces traveling on a conveyor. The system includes a support frame disposed proximate the conveyor, plural platforms supported by the support frame above and across the width of the conveyor, plural carriers sequentially disposed on each of the plural platforms across the width of the conveyor, a lateral drive in communication with each carrier, a nozzle module disposed within each of the plural carriers, and a swing drive in communication with each nozzle module. The lateral drive enables the selective bi-directional movement of the respective carrier along a lateral axis within the respective platform that is parallel to and above the conveyor and orthogonal to the direction of workpiece travel on the conveyor. Each nozzle module comprises a fluid manifold in fluid communication with a nozzle body and associated nozzle jet. The swing drive enables the selective orientation of the respective nozzle module about a swing axis that is parallel to the lateral axis.

In an embodiment, the plural platforms may be sequentially arranged along the direction of workpiece travel on the conveyor. Each nozzle body may comprise a spray pressure regulating valve for controlling the volumetric rate of fluid dispensed from the respective nozzle jet. Also, each nozzle body may comprise a spray pattern regulator for varying the width of the fluid spray pattern issuing from the respective nozzle jet.

Further, the manifold of each nozzle module may be disposed for selective rotation about the respective swing axis under the control of the respective swing drive. Each swing drive may be configured to selectively rotate the respective nozzle module up to 180 degrees about the respective swing axis. Each swing drive may be configured to selectively rotate the nozzle jet of the respective nozzle module to any position within an arcuate path between the nozzle jet being parallel to the conveyor and pointing in a direction of workpiece travel and the nozzle jet being parallel to the conveyor and pointing in a direction opposite the direction of workpiece travel.

Further still, each carrier may comprise a cleaning receptacle. The swing drive of the respective carrier is configured to selectively orient the respective nozzle module, such that fluids dispensed from the respective nozzle are received within the respective cleaning receptacle instead of impinging upon the conveyor or workpieces traveling thereon.

In a further embodiment, each platform may comprise parallel side rails, the side rails each being parallel to the conveyor and orthogonal to the direction of workpiece travel on the conveyor. Each carrier may comprise parallel slide bearings for movably suspending the carrier with respect to the side rails.

In yet another embodiment, the spray system may comprise a controller in communication with at least one of the lateral drive, the nozzle body, and the swing drive. The controller may further comprise a human machine interface for enabling selective interaction with the controller.

Each of the plural platforms may comprise a fluid distribution module in communication at least with each of the fluid manifolds of the respective platform. Each fluid distribution module may comprise a multi-input port valve stack in communication at least with each of the fluid manifolds of the respective platform. The multi-input port valve stack may be a three-input port valve stack. Plural ones of the input ports of the multi-input port valve stack may each be connected to a respective fluid supply and one of the input ports of the multi-input port valve stack is connected to a supply of cleaning fluid. The supply of cleaning fluid may be a water supply.

In embodiments, the fluid supplies and the cleaning fluid supply are each a pressurized fluid container. The multi-input port valve stack may comprise a pressure gauge in communication with each fluid manifold of the respective platform. The fluid distribution module may comprise a supply and return fluid line in communication each of fluid manifold of the respective platform. The support frame may support the fluid distribution module.

In further embodiments, the support frame may comprise rollers or wheels on an underside thereof to enable the spray system to be selectively located with respect to the conveyor. Each of the plural platforms may further comprise an elevating module for moving the respective platform in a direction orthogonal to the conveyor.

Further still, the system may comprise at least one sensor for detecting the presence or absence of a workpiece on the conveyor at a known distance with respect to the support frame. The at least one sensor alternatively may be for detecting the orientation of a workpiece on the conveyor. The system may further comprise a controller in communication with the lateral drive, the nozzle body, and the swing drive and operate in response to inputs from the at least one sensor. The at least one sensor may be optical or contact-based. The system may comprise at least one sensor for detecting the conveyor speed and rate of change of conveyor speed.

In yet another embodiment, the system includes a brush module proximate to and downstream of the support frame relative to the direction of workpiece travel. The brush module is used for selectively brushing wet fluids applied to workpieces on the conveyor by the plural nozzle modules. Further, the system may comprise a stain module for applying a layer of fluid stain to each workpiece prior to the workpiece traveling under the support frame.

In another aspect, the present disclosure provides a spray system for enabling the selective application of fluids onto workpieces traveling on a conveyor. The system comprises a platform disposed above and across the width of the conveyor. At least one carrier is disposed on the platform. A lateral drive is in communication with each carrier, the lateral drive enabling the selective bi-directional movement of the respective carrier along a lateral axis within the platform that is parallel to and above the conveyor and orthogonal to the direction of workpiece travel on the conveyor. A nozzle module is disposed within each carrier, each nozzle module comprising a fluid manifold in fluid communication with a nozzle body and associated nozzle jet. A swing drive is in communication with each nozzle module, the swing drive enabling the selective orientation of the respective nozzle module about a swing axis that is parallel to the lateral axis.

In an embodiment, each nozzle body may comprise a spray pressure regulating valve for controlling the volumetric rate of fluid dispensed from the respective nozzle jet. Further, each nozzle body may comprise a spray pattern regulator for varying the width of the fluid spray pattern issuing from the respective nozzle jet.

The manifold of each nozzle module may be disposed for selective rotation about the respective swing axis under the control of the respective swing drive. Each swing drive may be configured to selectively rotate the respective nozzle module up to 180 degrees about the respective swing axis. Each swing drive may be configured to selectively rotate the nozzle jet of the respective nozzle module to any position within an arcuate path between the nozzle jet being parallel to the conveyor and pointing in a direction of workpiece travel and the nozzle jet being parallel to the conveyor and pointing in a direction opposite the direction of workpiece travel.

In embodiments, each carrier may comprise a cleaning receptacle, and the swing drive of the respective carrier is configured to selectively orient the respective nozzle module whereby fluids dispensed from the respective nozzle are received within the respective cleaning receptacle instead of impinging upon the conveyor or workpieces traveling thereon.

Each platform may comprise parallel side rails, the side rails each being parallel to the conveyor and orthogonal to the direction of workpiece travel on the conveyor. Each carrier may comprise parallel slide bearings for movably suspending the carrier with respect to the side rails.

Further, the system may include a controller in communication with at least one of the lateral drive, the nozzle body, and the swing drive. The controller may further comprise a human machine interface for enabling selective interaction with the controller.

Each of the plural platforms may further comprise an elevating module for moving the respective platform in a direction orthogonal to the conveyor.

In further embodiments, the system may further comprise at least one sensor for detecting the orientation of a workpiece on the conveyor. The system may further comprise a controller in communication with the lateral drive, the nozzle body, and the swing drive in response to inputs from the at least one sensor. The at least one sensor may be optical or contact-based. The at least one sensor is used for detecting the conveyor speed and rate of change of conveyor speed.

In one aspect, the sensor detects a repaired defect and the programmable controller adjusts the selective application of fluids so as to apply a pattern or visual image near and/or over the repaired defect to make the defect more visually appealing. In another aspect, the sensor detects a repaired defect and the programmable controller adjusts the selective application of fluids and spray pattern so as to apply a spiral or circular knot image over the repaired defect, which becomes camouflaged by the spray pattern.

In yet another aspect, the present disclosure provides a method of selectively applying fluids onto workpieces traveling on a conveyor. The method comprises the steps of disposing a spray system proximate to the conveyor, detecting the leading edge of a workpiece moving on the conveyor towards the spray system, determining a desired pattern of fluid to be sprayed from at least one of the nozzle modules onto the workpiece, and selectively actuating a lateral drive, a spray pressure regulating valve, a spray pattern regulator, and a swing drive of each of plural carriers in response to sensor inputs and a desired pattern. The spray system comprises a support frame disposed proximate the conveyor, plural platforms supported by the support frame above and across the width of the conveyor, plural carriers sequentially disposed on each of the plural platforms across the width of the conveyor, a lateral drive in communication with each carrier, the lateral drive enabling the selective bi-directional movement of the respective carrier along a lateral axis within the respective platform that is parallel to and above the conveyor and orthogonal to the direction of workpiece travel on the conveyor, a nozzle module disposed within each of the plural carriers, each nozzle module comprising a fluid manifold in fluid communication with a nozzle body and associated nozzle jet, each nozzle body comprising a spray pressure regulating valve for controlling the volumetric rate of fluid dispensed from the respective nozzle jet and a spray pattern regulator for varying the width of the fluid spray pattern issuing from the respective nozzle jet, a swing drive in communication with each nozzle module, the swing drive enabling the selective orientation of the respective nozzle module about a swing axis that is parallel to the lateral axis, at least one sensor for detecting the orientation of a workpiece on the conveyor, and a controller in communication with the at least one sensor and the lateral drive, the spray pressure regulating valve, the spray pattern regulator and the swing drive of each carrier for selectively actuating the lateral drive, the spray pressure regulating valve, and the spray pattern regulator and the swing drive in response to inputs from the at least one sensor.

In an embodiment, the method may comprise selectively actuating the swing drive by selectively rotating the nozzle jet of the respective nozzle module to any position within an arcuate path between the nozzle jet being parallel to the conveyor and pointing in a direction of workpiece travel and the nozzle jet being parallel to the conveyor and pointing in a direction opposite the direction of workpiece travel.

Each carrier may comprise a cleaning receptacle and selectively actuating the swing drive may further comprise selectively orienting the respective nozzle module whereby fluids dispensed from the respective nozzle are received within the respective cleaning receptacle instead of impinging upon the conveyor or workpieces traveling thereon. Selectively actuating the lateral drive may also comprise selectively translating at least one of the plural carriers along the lateral axis within the respective platform.

In a further embodiment, the spray system may further comprise a fluid distribution module comprising plural supplies of fluids to be selectively applied to workpieces traveling on the conveyor, a valve system and associated conduits for selectively connecting each fluid manifold to one of the plural supplies. The method may further comprise selectively actuating the valve system, by the controller, in response to the desired pattern of fluid to be sprayed.

The spray system may further comprise an elevating module associated with each of the platforms for moving the respective platform in a direction orthogonal to the conveyor, the method comprising adjusting the height of at least one of the plural platforms by the controller in response to the desired pattern of fluid to be sprayed.

The at least one sensor may be further employed for detecting the orientation of the workpiece with respect to the conveyor, and the method may comprise selectively actuating the lateral drive, the spray pressure regulating valve, the spray pattern regulator and the swing drive of each carrier in response to inputs from the at least one sensor and the desired pattern.

The at least one sensor may further be employed for detecting the conveyor speed and rate of change of conveyor speed, and the method may comprise selectively actuating the lateral drive, the spray pressure regulating valve, the spray pattern regulator and the swing drive of each carrier in response to inputs from the at least one sensor and the desired pattern.

The spray system may further comprise a brush module disposed proximate to and downstream of the support frame relative to the direction of workpiece travel, and the method may further comprise selectively brushing wet fluids applied to each workpiece on the conveyor by the plural nozzle modules.

The spray system may further comprise a stain module and the method may further comprise applying a layer of fluid stain to each workpiece prior to the workpiece traveling under the support frame.

DETAILED DESCRIPTION OF EXEMPLARY EMBODIMENTS

Figure 1:
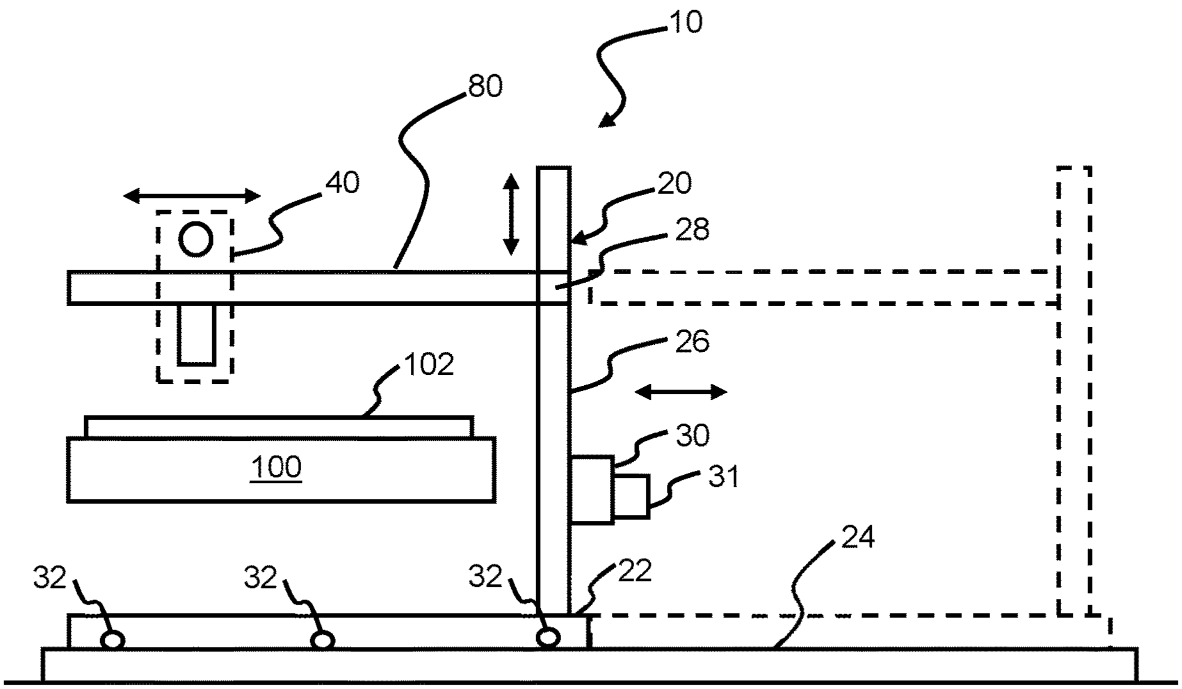
FIG. 1 is an elevation view of the presently disclosed spray system in position with respect to a conveyor and showing an alternative position in phantom.

FIG. 1 shows an elevation view of a spray system 10 according to the present disclosure proximate to a workpiece conveyor 100 (hereinafter 'conveyor'). The conveyor 100 may be, for example, a series or sequence of belt conveyor sections, as is known in the art. As depicted, the conveyor 100 runs in one direction, such as into the plane of the figure, and workpieces 102 lay on and are transported by the upper surface thereof. In one particular embodiment, the workpieces 102 comprise flooring boards, groups of flooring boards, or flooring panels. The flooring boards may include, inter alia, a synthetic/composite floor board, a hardwood board, an engineered hardwood board, a tile, and resilient floor boards. In other embodiments, the workpieces 102 comprise one or more of ceiling boards or panels, furniture, doors, millwork, and the like.

The spray system 10 includes a support frame 20 having at least one vertical support member 26 on one side of the conveyor 100, and may, in fact, include two such supports members, one on each side of the conveyor 100. These support members 26 may be provided of various materials and form factors, including, for example, 80/20 T-slot aluminum.

Extending from the illustrated vertical support member 26 is a platform 80. In the case where two vertical support members are provided, one on either side of the conveyor 100, the platform 80 extends there between. In an illustrative embodiment, there may be plural platforms, and specifically, two platforms (shown in FIG. 2), one closer to the source of workpieces 102 on the conveyor and one closer to the destination of such workpieces 102. The former direction may be referred to as "upstream" and the latter direction may be referred to as "downstream."

In one embodiment, each platform 80 is fixed to the associated vertical support member(s) 26. However, in another embodiment, each platform 80 may be provided with an elevating module 28 disposed at the junction of the platform 80 and the vertical support member(s) 26 for the purpose of adjusting the distance between the platform 80 and the conveyor 100, such as indicated by a vertical arrow in FIG. 1. In other words, the elevating module 28 enables the movement of the respective platform 80 in a direction orthogonal to the conveyor 100. For example, such an elevating module 28 may comprise a compression spring that may bias the platform 80 upward relative to the vertical support 26. Mechanical features, such as spring-loaded pins and cooperating orifices (not illustrated), disposed on the platform end and the vertical support 26 may enable the platform 80 to rise under the influence of the compression spring then be secured to the vertical support 26. The mechanical features may then be disengaged and the platform 80 urged downwardly against the spring pressure to a lower position, at which the mechanical features are re-engaged. Motorized drives (not shown) may also be employed, such as screw drives. Attached to the vertical support member(s) are a programmable controller 30 and a human machine interface 31.

Other forms of elevating modules 28 are contemplated, such as a stepper motor (not illustrated) and associated spur gear on the platform 80 cooperating with a vertically oriented rack disposed on the vertical support 26. In this embodiment, the stepper motor may be in communication with and under the control of a programmable logic controller 30 associated with the spray system 10, such as will be discussed subsequently.

Disposed upon the platform 80 of FIG. 1 is a carrier 40. In fact, plural carriers are typically installed on each platform 80, as will be discussed below. Each carrier 40 is provided with a lateral drive enabling bidirectional movement across the width of the respective platform 80, as indicated by a horizontal arrow in FIG. 1. Further details of the carriers 40 are provided subsequently.

A base 22 of the spray system 10 may be fixed in position relative to the conveyor 100. In an alternative embodiment, the base 22 of the spray system 10 is disposed on top of a floor rail 24. The floor rail 24 may be provided as linear racks with respective teeth (not shown) projecting upwardly therefrom. In this embodiment, the base 22 is provided with plural downwardly projecting spur gears or toothed wheels 32 that cooperate with the linear racks in enabling the spray system 10 to be rolled to and away from the conveyor 100, such as for alignment, test, and maintenance purposes. Other mechanisms for enabling the relative motion of the base 22 and an underlying structure replacing the floor rail 24 are possible, such as providing rollers or wheels on the underside of the base and by providing a planar member in place of the described floor rail 24.

Figure 2:
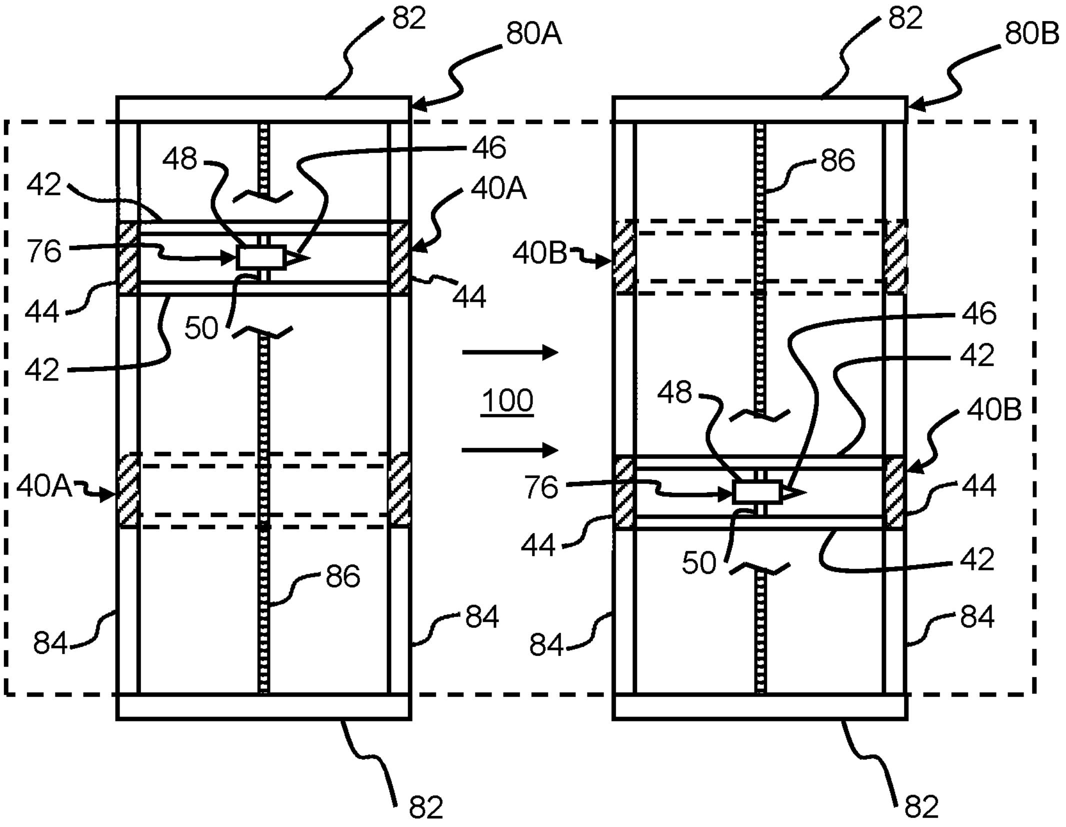
FIG. 2 is a top view of two platforms of the spray system of FIG. 1 in position with respect to an underlying conveyor.

An overhead view of a spray system 10 embodiment having two platforms 80A and 80B is shown in FIG. 2. As the conveyor 100 is shown to proceed in the left-to-right direction, as evidenced by horizontal arrows, and platform 80A may be regarded as the upstream platform and platform 80B may be regarded as the downstream platform.

Each platform 80A, 80B may include end members 82 that are substantially parallel to the edges of the conveyor 100 and the direction of conveyor movement and side members 84 that are substantially orthogonal to the edges of the conveyor 100 and the direction of conveyor movement. The platform end and side members may be provided of T-slot structural framing in one embodiment. Also, a variety of other materials and structures may be employed in addition, including 3-D printed elements or modules.

The platforms 80A and 80B are each shown with only one respective carrier 40A, 40B thereon, though as described in the foregoing there are in one spray system embodiment 10 multiple carriers per platform, as suggested by carriers 40A and 40B shown in phantom. In particular, one embodiment of the presently disclosed spray system includes seven carriers per platform, sequentially disposed on the respective platform across the width of the conveyor 100.

As will be described in greater detail subsequently, each carrier 40A, 40B includes side members 42 and end members 44. The side members 42 are, in one embodiment, glide bearings that cooperate with the side members 84 of the respective platform 80A, 80B to enable the respective carrier to slide widthwise across a portion of the platform and thus across a portion of the width of the conveyor 100. In another embodiment, the side members include one or more linear slide bearings. These bearings may be, for example, fabricated of ultra-high-molecular-weight polyethylene (UHMW) or self-lubricating composite material attached to mounting hardware. In the case where the side members 42 are T-slot members, these slide bearings may be attached to the inside or outside of the respective T-slot member via T-nuts and bolts, for example. A gear rail 86 is provided within each platform to enable motorized movement across the respective platform (discussed below). However, manual manipulation of carrier 40A, 40B position may also be utilized.

Disposed within each carrier 40A, 40B is a respective nozzle module 76. Each nozzle module is comprised of a nozzle body 48 and associated nozzle jet 46. Each nozzle module also comprises a fluid manifold 64 (shown in FIGS. 3B and 3C), as will be discussed below, and is disposed for rotation about a shaft 50 within the respective carrier. In one embodiment, a digital print head could replace one or more nozzles. In some examples, the digital print heads used in the system described herein may include, but are not limited to, inkjet print heads or other print heads that are relatively simple, inexpensive, and low-maintenance. The digital print head would be positioned within one inch of the workpiece.

Figure 3A:
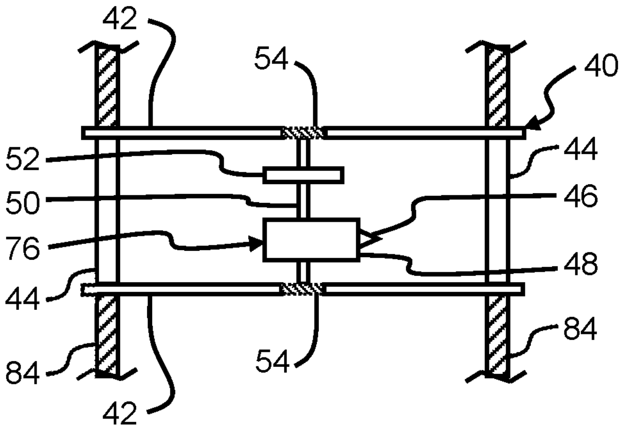
FIG. 3A is a top view of a carrier of the spray system of FIG. 1 disposed for lateral translation with respect to a portion of a respective platform.
Figure 3B:
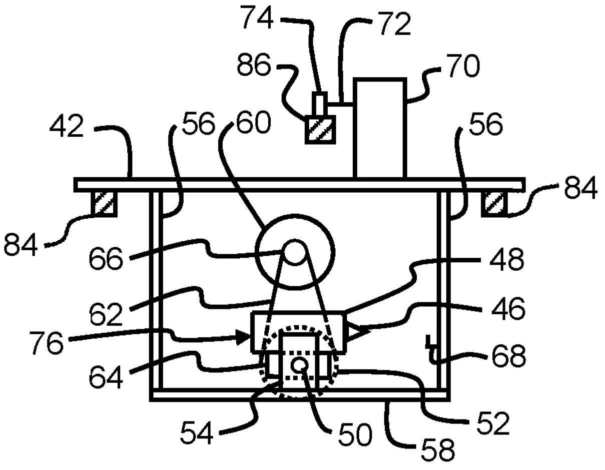
FIG. 3B is a side view of the carrier of FIG. 3A.
Figure 3C:
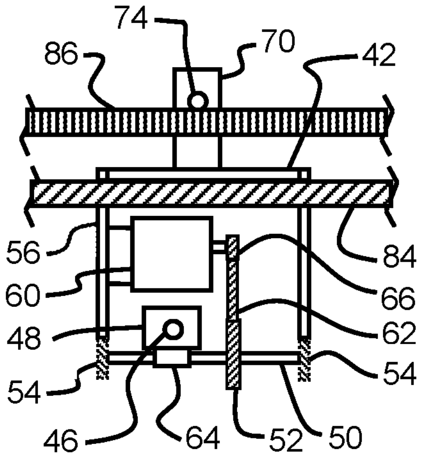
FIG. 3C is an end view of the carrier of FIGS. 3A and 3B.

FIGS. 3A, 3B and 3C illustrate one exemplary carrier 40 in plan, side, and end views, respectively. From a plan view perspective, the carrier 40 includes a pair of opposing, parallel side members 42 and a pair of opposing, parallel end members 44. As noted above, the end members are provided as slide bearings, in the illustrated embodiment, that are capable of movably supporting the carrier 40 with respect to the respective platform side members 84.

Motion across the width of the platform 80 is facilitated by a lateral drive 70 that, in one embodiment, is a stepper motor with associated drive axle 72 and drive gear 74 disposed on the drive axle 72. The drive gear 74 interacts with a gear rail 86 of the platform 80. The lateral drive 70 is in communication with a programmable controller 30 associated with the support frame 20 for selectively moving the carrier 40 bi-directionally across the platform 80 and the conveyor 100, as the slide bearings 44 interact with the platform side members 84.

As there are typically plural carriers 40 supported by each platform 80, the extent to which any one carrier 40 may be moved laterally, by the respective lateral drive 70, is limited. The programmable controller 30, being responsible for selective actuation of each lateral drive 70, is capable of coordinated movement of all carriers 40 as required or desired. Position sensors (not shown) may be provided in conjunction with each carrier 40 and in communication with the programmable controller 30, such that the exact position of each carrier 40 may be known at all times. With this data, the programmable controller 30 may be further capable of non-contact, coordinated, lateral carrier movement. The programmable controller 30 may be, for example, an OPTO 22 Groov EPIC System or similar. A Programmable Logic Controller (PLC) may also be used for this purpose.

Projecting downwardly from the side members 42 of each carrier 40 are vertical support members 56. In one embodiment, four such vertical support members 56 are provided, one near each intersection of a side member 42 and an end member 44. Between the lower extent of each of a pair of vertical support members 56 is a cross member 58. The two cross members 58 are mutually parallel and are substantially parallel with the direction of workpiece travel.

As noted above, each carrier 40 has an associated swing drive 60 and nozzle module 76. As illustrated in diagrammatic form in FIG. 4, the nozzle module comprises a nozzle body 48, a nozzle jet 46, and an associated fluid manifold 64.

The nozzle body 48 comprises a spray pressure regulating valve 77 for selectively controlling the volumetric rate of fluid dispensed from the respective nozzle jet 46. This valve 77 is in communication with the programmable controller 30 whereby the fluid flow through the nozzle jet 46 may be turned on and off, and, if on, can be rate and intensity controlled. The pressure valve 77 may be an electrically controlled pneumatic pressure regulating control valve operating at 0 to 100 psi, with 0-10 VDC or 4-20 mA from the programmable controller 30.

The nozzle body 48 also comprises a spray pattern regulator 78 for selectively varying the width of the fluid spray pattern issuing from the respective nozzle jet 46. This spray pattern regulator 78 is also in communication with the programmable controller 30 for varying the flow of fan air through the respective nozzle jet 46, and thus respective spray pattern, and is also an electrically controlled pneumatic pressure regulator operating at 0 to 100 psi, with 0-10 VDC or 4-20 mA from the programmable controller 30.

The fluid manifold 64 provides an interface for each of a fluid supply line 96 and a fluid return line 98 and provides an internal fluid path to the nozzle body 48 and hence to the nozzle jet 46 via the spray pressure regulating valve 77 and the spray pattern regulator 78.

The fluid manifold 64 also provides a feature for receiving therethrough and engaging with a swing drive shaft 50. This shaft 50, which extends across a portion of the width of the carrier 40, is rotatably retained within shelf bearings 54 disposed in the cross members 58. Attached to the swing drive shaft 50 is a swing pulley 52. This pulley 52 is engaged by a swing belt 62 that also is engaged by a swing drive gear 66. The swing drive gear 66 is selectively driven by a swing drive 60 mounted within the carrier 40. This drive 60 is in communication with the programmable controller 30 such that selective actuation controls the tilt of the nozzle module about the swing drive shaft Through this arrangement, the nozzle jet 46 may be selectively oriented in an arcuate path from having a directional component directed downstream, to pointing down, to having a directional component directed upstream. In an embodiment, the range of selective orientations is throughout an arc of 180 degrees, from the nozzle jet pointing parallel to the conveyor and downstream to pointing parallel to the conveyor and upstream and any orientation therebetween. As the swing drive 60 rotates the associated nozzle jet 46 about the swing drive shaft 50, enhanced variations in fluid patterning are achievable, thereby improving the natural and non-mechanical appearance of the patterning. The nozzle jet 46 can be controlled individually or as a group. Also, the nozzle jet 46 can be moved individually or as a group.

To enhance the perception of variability in the applied patterns, the swing drive 60, the spray pressure regulating valve 77, and/or the spray pattern regulator 78 command path may be modified with an offset, which is derived from a random number generator to ensure a degree of variability in the applied pattern. These elements may be independently controlled by the programmable controller 30 or may be controlled in groups.

Disposed across the pair of vertical support members 56 that are upstream is a fluid catch pan, catch basin, or cleaning receptacle 68. When the nozzle module 76 is oriented with the nozzle jet 46 pointing downstream, fluid sprayed from the jet impinges upon the catch basin. This is useful when a cleaning fluid, such as water, is cycled through the fluid manifold 64, the nozzle body 48, and the nozzle jet 46 for cleaning purposes. The catch basin may be provided with a drain and associated drain line (not shown). Cleaning fluid is thus received within the cleaning receptacle 68 rather than impinging upon the conveyor or workpieces traveling thereon. The system claimed herein, including the valve stacks 92 (shown in FIG. 4), the fluid containers 94 (shown in FIG. 4), the catch basin, the cleaning receptacle 68, etc., permits the user to switch ink and/or paint colors very quickly, about five minutes or less whereas traditional systems and methods would typically require thirty minutes or more to clean out the lines and switch fluids, such as inks and/or paints.

The programmable controller 30 may be mounted on a portion of the support frame 20 taking into consideration ease of access, ease of connecting to a source of power, protection from sprayed fluids, etc. Associated with the programmable controller in one embodiment, physically and/or communicatively, is a human machine interface (HMI) 31. This interface 31 enables an operator to select one of different spray patterns or "recipes," to monitor the performance of the system, to check the status of consumables, to make adjustments to a predefined spray pattern, to stop the spray system operation, and to cut power, among other functions.

Figure 4:
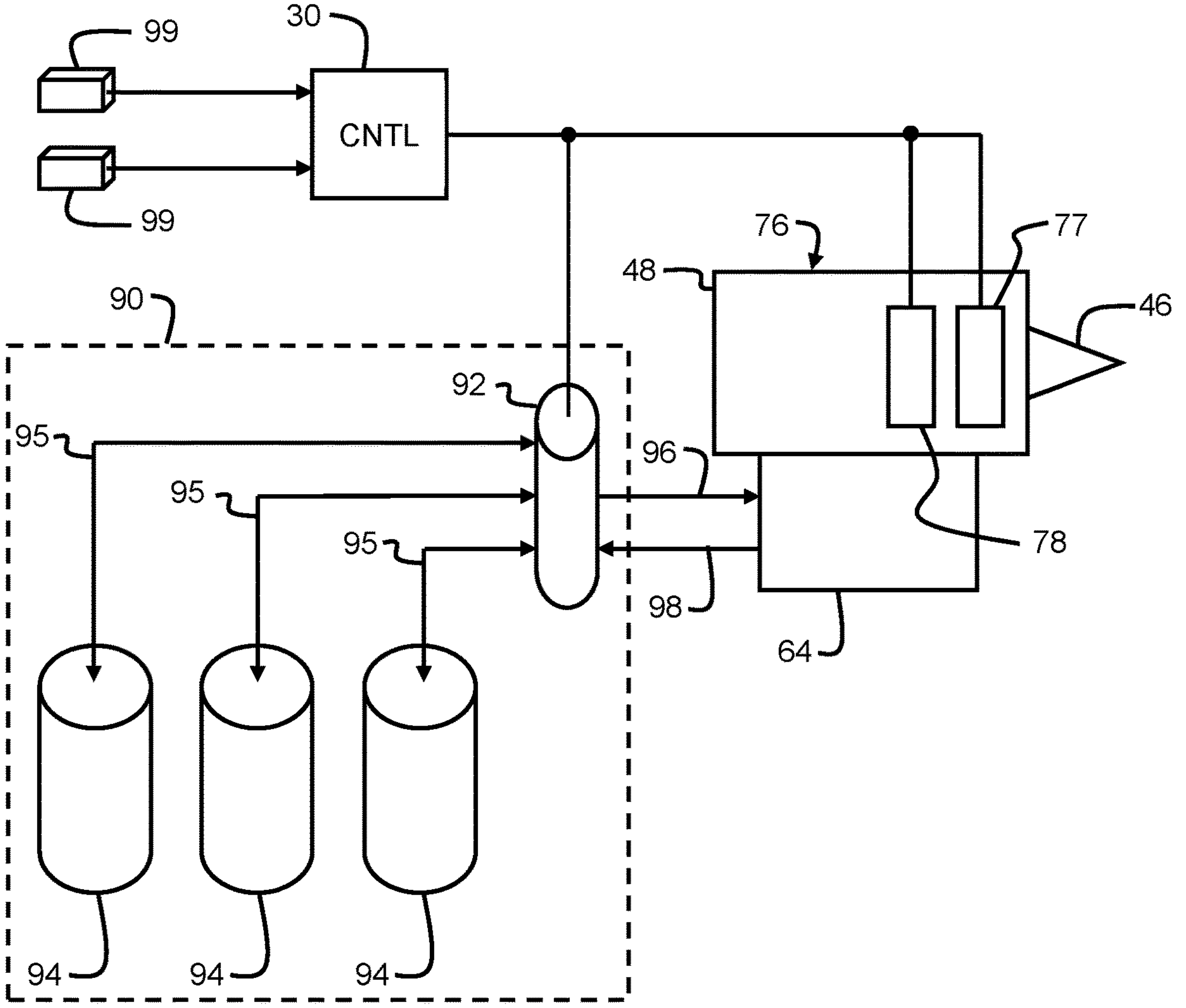
FIG. 4 is a schematic diagram of a fluid distribution module in communication with a controller and nozzle module of the spray system of FIG. 1.

With respect to FIG. 4, the presently disclosed spray system 10 further comprises a fluid distribution module 90. This module, which may be located within and attached to the frame 20, includes a multi-input port valve stack 92 in communication with each of the fluid manifolds 64 in the system. For example, the valve stack 92 is a three-input valve stack. Each of the input ports of the valve stack 92 is connected to a respective fluid container 94, which may be pressurized, via a conduit 95. Each container 94 may contain a fluid to be sprayed or applied to a workpiece 102 or may contain a cleaning fluid, such as water. In an embodiment, the containers are ten-gallon pressure pots, each having an air or electrically powered agitator, a 100 micron mesh in-line filter, a level gauge in communication with the controller 30, and/or a local manual level gauge indicator. The fluids to be applied to workpieces 102 may include paint or stain. In an embodiment, at least one of the input ports to the valve stack 92 is connected to the source of cleaning fluid, such as water. In another embodiment, a pressure gauge (not shown) is in communication with each fluid manifold 64 of a respective platform 80 and is also in communication with the programmable controller 30.

All fluid manifolds 64 within a given platform 80 are connected to the same fluid container 94 at any one time, in one embodiment. In alternative embodiments, however, multiple fluid containers 94 may each be connected to one or more fluid manifolds 64 within a platform 80 at the same time, in order to provide multiple colors of fluids (i.e., inks, paints, or stains) at the same time. Multiple valve stacks 92 may be employed in this alternative embodiment.

The valve stack 92 is in communication with each fluid manifold 64 via the fluid supply lines 96 and fluid return lines 98. These lines also form a portion of the fluid distribution module 90.

Also in communication with the programmable controller 30 is one or more sensors 99. These sensors 99 may be disposed on the support frame 20 or may be disposed of the support frame 20 in conjunction with the conveyor 100. The sensors 99 may be contact-based and/or optical and are configured to detect the presence of a workpiece 102 on the conveyor 100 upstream of the spray system 10. Such detection may be the detection of a leading and/or trailing edge of a workpiece 102. Alternatively, or in addition thereto, the sensors 99 may be configured to detect the orientation of a workpiece 102 relative to the orientation of the conveyor 100. Further still, one or more sensors 99 may be in communication with a portion or portions of the conveyor 100 to characterize the conveyor 100 speed and/or acceleration or deceleration. Fast production speeds greater than about 75 ft/min can be achieved with the claimed system. Lastly, the sensors 99 (e.g., laser and/or camera) may detect certain characteristics of the workpiece 102, such as a knot in wood, and the programmable controller 30 may adjust the operational characteristics of the system and/or the pattern of spray accordingly In a further embodiment, the sensors 99 may detect a repaired defect in the workpiece 102, such as a puttied or filled void, and the programmable controller 30 may adjust the operational characteristics and/or the pattern of spray to apply a pattern or visual image on or around that area of the workpiece 102 to make the repaired defect more visually appealing. In another embodiment, a spiral or circular knot image may be applied over the area of the puttied defect of the workpiece 102. Special computer programs may be written to identify and grade each defect and/or repaired defect to establish size and/or color limits for the various defect and repairs thereof, which may be camouflaged by the spray pattern.

Based upon the sensor 99 input(s), the programmable controller 30 is capable of selectively actuating ones of the swing drives 60, lateral drives 70, spray pressure regulating valves 77 and/or spray pattern regulators 78 in order to apply a consistent pattern of fluid according to a predefined application regimen stored in memory accessible by the programmable controller 30, even if a workpiece 102 is oriented at an angle to the path of workpiece travel.

The communication between the controller 30 and these elements may be wired, wireless, or some combination thereof.

Power to the controller and other elements of the presently disclosed spray system 10 is provided in a conventional manner. Remote access to and control over the controller 30 may also be provided by wireless, networked devices, such as mobile phones or tablet computers.

In addition to the foregoing components, the presently disclosed system 10 may include a brush module disposed proximate to and downstream of the support frame 20 relative to the direction of workpiece 102 travel. Varying patterns of stain and paint may be created via use of the brush module by selectively brushing wet fluids applied to each workpiece 102 on the conveyor 100 by the plural nozzle modules.

The presently disclosed spray system 10 may further comprise a stain module for applying a layer of fluid stain to each workpiece 102 prior to the workpiece 102 traveling under the support frame 20. This module may be a roll coated UV stain applicator. In another embodiment, the roll coated UV stain applicator can be situated so that the roll coat is applied to the workpiece 102 after the workpiece 102 has been stained by spraying. In some embodiments, there is a drying step for drying the initial fluid applied to the workpiece 102 before a second fluid is applied. In other embodiments, there is no drying step between the multiple fluids applied to the workpiece.

In some instances, the spray patterns will cover the entire length of the workpiece 102. In other cases, the spray patterns will cover a certain portion(s) of the workpiece 102. In a similar fashion, the width of the spray pattern can vary, such that, for example, 75% of the width can be sprayed along the entire length of the workpiece 102 or the pattern could be such that at one end of the workpiece 102, 75% of width can be sprayed but the spray can be tapered to 10% width at the other end of the workpiece 102. Also, the intensities of the fluids can be different on different portions of the workpiece so that the trailing ends, for example, can be lighter or darker than the center of the workpiece. This can be accomplished by the use of different color fluids or by adjusting the flow rate so that less fluid is applied to the workpiece 102. The above-mentioned operation of the system achieves patterns that appear to be manually sprayed (manually finished look—sprayed by hand) while using automated spray heads that spray accent marks over a partial area of a workpiece in combination with roll coating further avoid the mechanical look that comes from using an automated system.

Figure 5A:
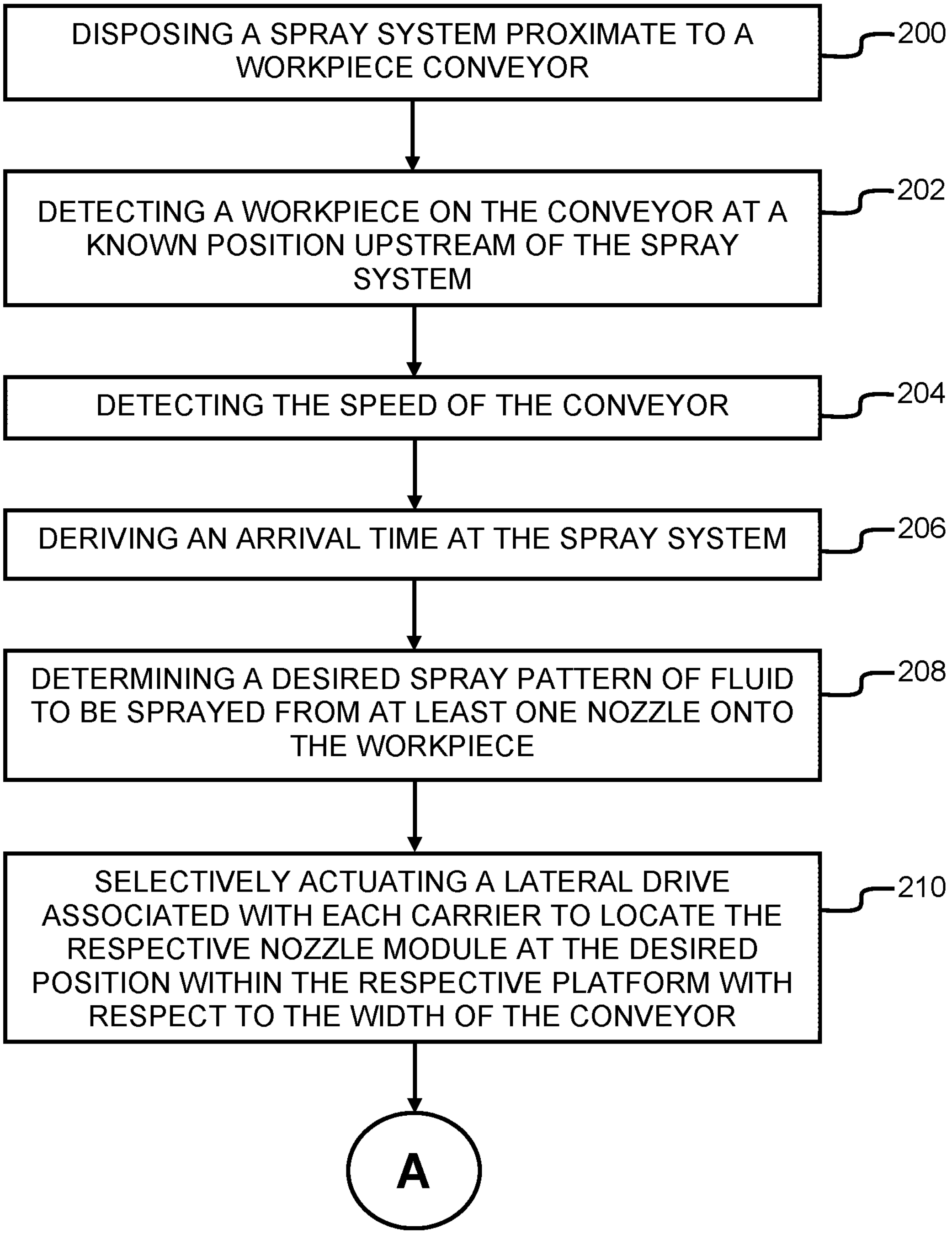
FIGS. 5A and 5B are together a flowchart of a method of use for the spray system of FIG. 1.
Figure 5B:
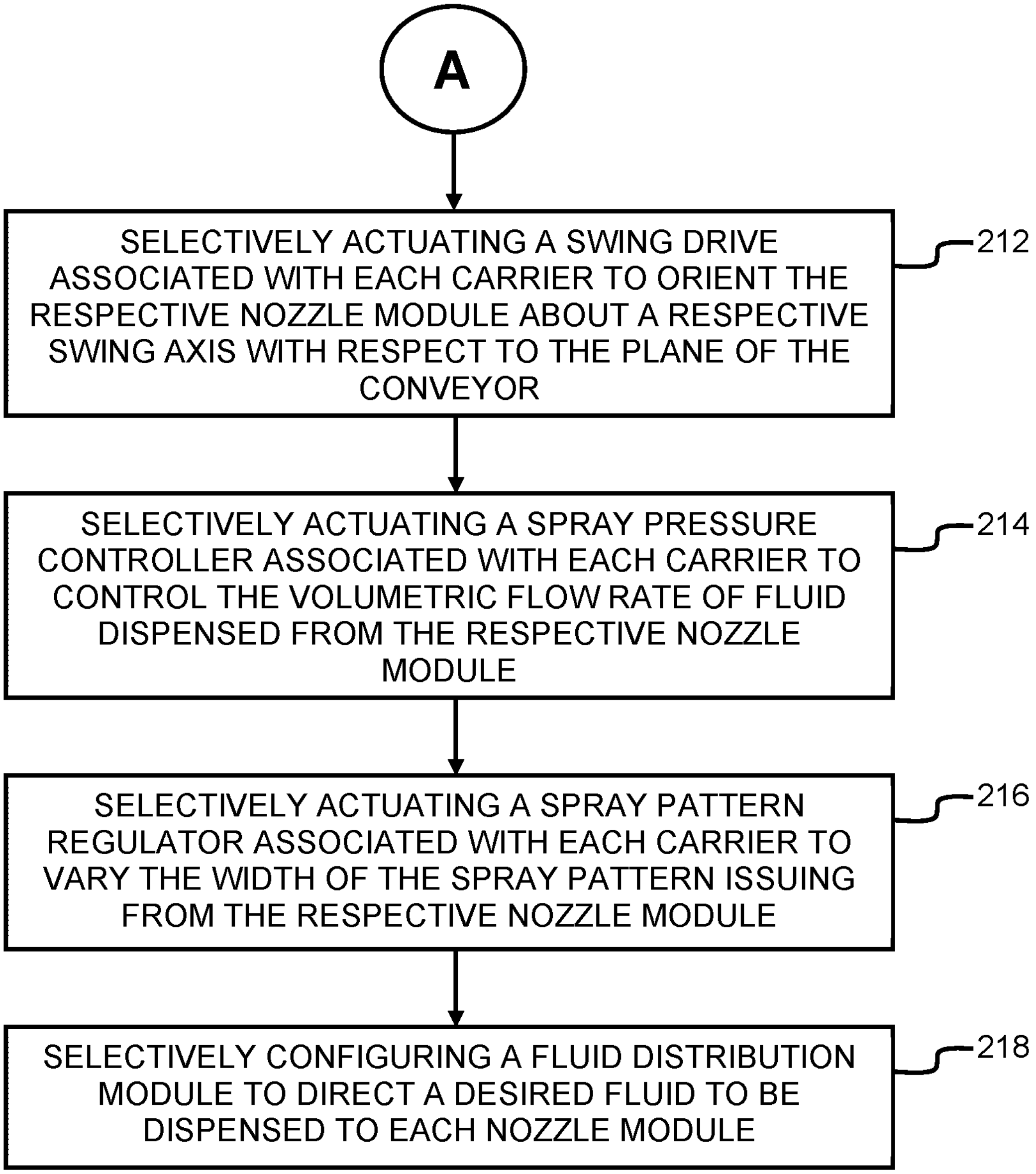

A method of selectively applying fluids onto workpieces 102 traveling on a conveyor 100 using the spray system as described in the foregoing is described with respect to FIGS. 5A and 5B. A spray system 10, such as previously described, is disposed 200 proximate a workpiece conveyor 100.

A workpiece 102 on the conveyor 100 is detected 202 by one or more sensors 99 at a known position upstream of the spray system 10 and communicated to the programmable controller 30. The speed of the conveyor may also be detected 204 by the at least one sensor and communicated to the programmable controller 30. From this sensor information, the programmable controller 30 is capable of deriving 206 an arrival time of the workpiece 102 from which fluid spray application is timed. Also from this sensor information, the lateral orientation of plural nozzle modules 76 is also calculated, such that adjustments in lateral positioning and tilt may be made to accommodate any workpiece orientation.

A desired spray pattern of fluid to be sprayed from at least one nozzle module 76 onto the workpiece is determined 208 by the programmable controller 30 with reference to predefined spray pattern information stored in either local or remote memory and based upon the sensor input. A lateral drive 70 associated with each carrier 40 is then selectively actuated 210 to laterally orient each nozzle module 76 with reference to the width of the conveyor 100.

A swing drive 60 associated with each carrier 40 is selectively actuated 212 to orient the respective nozzle module 76 with respect to the plane of the conveyor 100. A spray pressure controller 77 associated with each nozzle carrier 40 is selectively actuated 214 to control the volumetric flow rate of fluid dispensed from the respective nozzle module 76. A spray pattern regulator 78 associated with each carrier 40 is selectively actuated 216 to vary the width of the spray pattern issuing from the respective nozzle module.

In addition, the fluid distribution module 90 may be selectively configured 218 to direct a desired fluid via conduits 95 from one of several fluid sources 94 to be dispensed from each nozzle module 76.

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

What is claimed is:

1. A spray system for enabling selective application of fluids onto workpieces traveling on a conveyor, the system comprising:

a support frame disposed proximate the conveyor;

plural platforms supported by the support frame above and across a width of the conveyor;

plural carriers sequentially disposed on each of the plural platforms across the width of the conveyor;

a lateral drive, which is in communication with each carrier, the lateral drive enabling the selective bi-directional movement of the respective carrier along a lateral axis within the respective platform that is parallel to and above the conveyor and orthogonal to a direction of workpiece travel on the conveyor;

a nozzle module disposed within each of the plural carriers, each nozzle module comprising a fluid manifold in fluid communication with a nozzle body and associated nozzle jet;

a swing drive in communication with each nozzle module, the swing drive enabling the selective orientation of the respective nozzle module about a swing axis that is parallel to the lateral axis;

one or more laser or camera optical sensors disposed on the support frame enabling detection of a workpiece on the conveyor at a known position upstream of each carrier, enabling detection of conveyor speed and/or acceleration or deceleration, enabling detection of the workpiece arrival time at each carrier, and enabling detection of certain characteristic patterns of a workpiece; and a controller in communication with the lateral drive, the nozzle body, and the swing drive in response to inputs from one or more laser or camera optical sensors;

wherein the operational characteristics of the spray system and/or spray pattern can be selectively adjusted or controlled.

2. The spray system of claim 1, wherein the plural platforms are sequentially arranged along the direction of workpiece travel on the conveyor.

3. The spray system of claim 1, wherein each nozzle body comprises a spray pressure regulating valve for controlling the volumetric rate of fluid dispensed from the respective nozzle jet.

4. The spray system of claim 1, wherein each nozzle body comprises a spray pattern regulator for varying a width of the fluid spray pattern issuing from the respective nozzle jet.

5. The spray system of claim 1, wherein a manifold of each nozzle module is disposed for selective rotation about the respective swing axis under control of the respective swing drive.

6. The spray system of claim 1, wherein each swing drive is configured to selectively rotate the respective nozzle module up to 180 degrees about the respective swing axis.

7. The spray system of claim 1, wherein each swing drive is configured to selectively rotate the nozzle jet of the respective nozzle module to any position within an arcuate path between the nozzle jet being parallel to the conveyor and pointing in a direction of workpiece travel and the nozzle jet being parallel to the conveyor and pointing in a direction opposite the direction of workpiece travel.

8. The spray system of claim 1, wherein each carrier comprises a cleaning receptacle, and wherein the swing drive of the respective carrier is configured to selectively orient the respective nozzle module whereby fluids dispensed from the respective nozzle are received within the respective cleaning receptacle.

9. The spray system of claim 1, wherein each platform comprises parallel side rails, the side rails each being parallel to the conveyor and orthogonal to the direction of workpiece travel on the conveyor.

10. The spray system of claim 9, wherein each carrier comprises parallel slide bearings for movably suspending the carrier with respect to the side rails.

11. The spray system of claim 1, further comprising a controller in communication with at least one of the lateral drive, the nozzle body, and the swing drive.

12. The spray system of claim 11, wherein the controller further comprises a human machine interface for enabling selective interaction with the controller.

13. The spray system of claim 1, wherein each of the plural platforms comprises a fluid distribution module in communication at least with each of the fluid manifolds of the respective platform.

14. The spray system of claim 13, wherein each fluid distribution module comprises a multi-input port valve stack in communication at least with each of the fluid manifolds of the respective platform.

15. The spray system of claim 14, wherein the multi-input port valve stack is a three-input port valve stack.

16. The spray system of claim 14, wherein plural of the input ports of the multi-input port valve stack are each connected to a respective fluid supply and wherein one of the input ports of the multi-input port valve stack is connected to a supply of cleaning fluid.

17. The spray system of claim 16, wherein the supply of cleaning fluid is a water supply.

18. The spray system of claim 16, where each of the fluid supplies and the cleaning fluid supply is a pressurized fluid container.

19. The spray system of claim 14, wherein the multi-input port valve stack comprises a pressure gauge in communication with each fluid manifold of the respective platform.

20. The spray system of claim 13, wherein the fluid distribution module comprises a supply and return fluid line in communication with each fluid manifold of the respective platform.

21. The spray system of claim 13, wherein the support frame supports the fluid distribution module.

22. The spray system of claim 1, wherein the support frame comprises rollers or wheels on an underside thereof to enable the spray system to be selectively located with respect to the conveyor.

23. The spray system of claim 1, wherein each of the plural platforms further comprises an elevating module for moving the respective platform in a direction orthogonal to the conveyor.

24. The spray system of claim 1, further comprising at least one sensor for detecting the orientation of a workpiece on the conveyor.

25. The spray system of claim 1, further comprising a contact-based sensor.

26. The spray system of claim 1, further comprising a brush module disposed proximate to and downstream of the support frame relative to the direction of workpiece travel, the brush module being disposed to selectively brush wet fluids applied to workpieces on the conveyor by the plural nozzle modules.

27. The spray system of claim 1, further comprising a stain module for applying a layer of fluid stain to each workpiece prior to the workpiece traveling under the support frame.

28. A spray system for enabling the selective application of fluids onto workpieces traveling on a conveyor, the system comprising:

a platform disposed above and across the width of the conveyor; at least one carrier disposed on the platform;

a lateral drive, which is in communication with each carrier, the lateral drive enabling the selective bi-directional movement of the respective carrier along a lateral axis within the platform that is parallel to and above the conveyor and orthogonal to the direction of workpiece travel on the conveyor;

a nozzle module disposed within each carrier, each nozzle module comprising a fluid manifold in fluid communication with a nozzle body and associated nozzle jet;

a swing drive in communication with each nozzle module, the swing drive enabling the selective orientation of the respective nozzle module about a swing axis that is parallel to the lateral axis;

one or more laser or camera optical sensors disposed on the support frame enabling detection of a workpiece on the conveyor at a known position upstream of each carrier, enabling detection of conveyor speed and/or acceleration or deceleration, enabling detection of the workpiece arrival time at each carrier, and enabling detection of certain characteristic patterns of a workpiece; and a controller in communication with the lateral drive, the nozzle body, and the swing drive in response to inputs from one or more laser or camera optical sensors;

wherein the operational characteristics of the spray system and/or spray pattern can be selectively adjusted or controlled.

29. The spray system of claim 28, wherein each nozzle body comprises a spray pressure regulating valve for controlling the volumetric rate of fluid dispensed from the respective nozzle jet.

30. The spray system of claim 28, wherein each nozzle body comprises a spray pattern regulator for varying the width of the fluid spray pattern issuing from the respective nozzle jet.

31. The spray system of claim 28, wherein the manifold of each nozzle module is disposed for selective rotation about the respective swing axis under the control of the respective swing drive.

32. The spray system of claim 28, wherein each swing drive is configured to selectively rotate the respective nozzle module up to 180 degrees about the respective swing axis.

33. The spray system of claim 28, wherein each swing drive is configured to selectively rotate the nozzle jet of the respective nozzle module to any position within an arcuate path between the nozzle jet being parallel to the conveyor and pointing in a direction of workpiece travel and the nozzle jet being parallel to the conveyor and pointing in a direction opposite the direction of workpiece travel.

34. The spray system of claim 28, wherein each carrier comprises a cleaning receptacle, and wherein the swing drive of the respective carrier is configured to selectively orient the respective nozzle module whereby fluids dispensed from the respective nozzle are received within the respective cleaning receptacle.

35. The spray system of claim 28, wherein each platform comprises parallel side rails, the side rails each being parallel to the conveyor and orthogonal to the direction of workpiece travel on the conveyor.

36. The spray system of claim 35, wherein each carrier comprises parallel slide bearings for movably suspending the carrier with respect to the side rails.

37. The spray system of claim 28, further comprising a controller in communication with at least one of the lateral drive, the nozzle body and the swing drive.

38. The spray system of claim 37, wherein the controller further comprises a human machine interface for enabling selective interaction with the controller.

39. The spray system of claim 28, wherein each of the plural platforms further comprises an elevating module for moving the respective platform in a direction orthogonal to the conveyor.

40. The spray system of claim 28 wherein the sensor detects a repaired defect and the programmable controller adjusts the selective application of fluids so as to apply a pattern or visual image near and/or over the repaired defect to make the defect more visually appealing.

41. The spray system of claim 40, further comprising a controller in communication with the lateral drive, the nozzle body, and the swing drive in response to inputs from the at least one sensor.

42. The spray system of claim 40, further comprising a contact-based sensor.

43. The spray system of claim 28 wherein the sensor detects a repaired defect and the programmable controller adjusts the selective application of fluids and spray pattern so as to apply a spiral or circular knot image over the repaired defect, which becomes camouflaged by the spray pattern.

* * * * *